United States Patent
Reum et al.

[11] Patent Number: 5,519,970
[45] Date of Patent: May 28, 1996

[54] LANDSCAPE EDGING

[75] Inventors: Donald J. Reum, Bonita Springs, Fla.; Mark Reum, Albany, Minn.

[73] Assignee: Avon Plastics, Inc., Albany, Minn.

[21] Appl. No.: 252,277

[22] Filed: Jun. 1, 1994

Related U.S. Application Data

[63] Continuation-in-part of Ser. No. 126,426, Sep. 24, 1993, abandoned.

[51] Int. Cl.⁶ .............................. E02D 27/00; A01G 1/00
[52] U.S. Cl. ................... 52/102; 47/33; 52/101; 52/103; 52/104
[58] Field of Search .................. 52/101, 102, 103, 52/104; 47/334

[56] References Cited

U.S. PATENT DOCUMENTS

| | | | |
|---|---|---|---|
| 3,387,786 | 6/1968 | Rynberk | 47/33 X |
| 3,933,311 | 1/1976 | Lemelson | 47/33 X |
| 4,644,685 | 2/1987 | Tisbo et al. | 47/33 |
| 4,761,923 | 8/1988 | Reum et al. | 52/102 |
| 4,858,379 | 8/1989 | West | 47/33 |
| 4,984,689 | 1/1991 | Emalfarb et al. | 47/33 X |
| 5,092,076 | 3/1992 | Terreta | 52/102 X |
| 5,106,235 | 4/1992 | King | 52/102 X |
| 5,201,154 | 4/1993 | Thomas | 52/102 |
| 5,274,969 | 1/1994 | Kazakidis | 52/102 |
| 5,375,369 | 1/1994 | Verhoeve | 47/33 |

*Primary Examiner*—Wynn E. Wood
*Attorney, Agent, or Firm*—Merchant, Gould, Smith, Edell, Welter & Schmidt

[57] ABSTRACT

Plastic extruded landscape edging is disclosed which consists of an elongated body member, a top rail member extending longitudinally along the top portion of the body member and an anchor member extending longitudinally along the bottom portion of the body member and projecting laterally outward from each side thereof. A tongue member is formed on one side of the anchor member and a groove sized to receive the tongue member is formed in the opposite side of the anchor member, both of which extend longitudinally over its length. The tongue member and groove are mutually engageable when adjacent portions of the edging are disposed in side by side relation, such as when a length of the edging is coiled for packaging purposes, thus retaining the edging in side by side relation.

22 Claims, 7 Drawing Sheets

LANDSCAPE EDGING

This is a continuation-in-part of application Ser. No. 08/126,426 filed Sept. 24, 1993, now abandoned.

BACKGROUND OF THE INVENTION

The invention is directed to landscape edging used as a barrier between landscaped areas of different composition.

Landscape edging is now commonly used to divide different landscape areas to preclude one area from spilling or growing into an adjacent area For example, landscape edging is effectively used as a divider between grass and a flower bed to prevent the grass from taking root in the flower bed, and also to prevent bedding material in the flower bed from spilling into the grass.

In the past, landscape edging has been formed from lengths of wood or corrugated metal strips and such materials have served reasonably adequately. However, wood decays over a period of time, and metal has a tendency to rust, corrode, or to become bent and misshapen over time. Consequently, the most prevalent materials used for landscape edging today are inert synthetic plastics such as polyethylene and ethylene vinyl acetate. These materials are generally flexible and are therefore easily installed, while at the same time having an extended life expectancy that avoids the necessity of replacement at frequent intervals.

Although landscape edging formed from inert synthetic materials provides a better product because deterioration is avoided, problems nevertheless occur due to the environment in which the landscape edging is installed. More specifically, conventional edging normally consists of a longitudinally extending strip of material having a lower edge that is inserted into the ground to a predetermined depth, and an upper edge or rall that generally projects above the ground. The edging is typically installed by digging a narrow trench, inserting the lower edge to a predetermined depth, refilling the trench and compacting the earth around the edging. Such installation normally maintains the edging in its intended position for a period of time. However, the environment in which the landscape edging is placed usually works against its remaining in place over extended periods of time. More specifically, the edging may be walked on, bumped, kicked or otherwise engaged, and repeatedly driven over by lawn mowers or lawn tractors.

Equally severe to the integrity and placement of landscape edging is freezing of the ground at and below the level of the edging during the winter months. The ground retains moisture in the fall, which freezes with dropping temperatures. Water is one of few materials having a coefficient of volume expansion that increases as temperature decreases, and the ground accordingly expands with frozen moisture in the winter. This has the effect of compressing the landscape edging, which can cause it to break as well as to become displaced.

As temperatures rise, the moisture beneath the ground surface melts, again changing the subsurface ground composition. As these seasonal temperature changes alternate, the landscape edging is repeatedly exposed to a variety of forces that, over the long term, cause it to become dislodged and/or damaged.

This invention is a result of an endeavor to design landscape edging that is no more complex from the structural standpoint than conventional edgings, but which will be initially anchored and remain in a stable position from season to season, thus extending its useful life.

The inventive edging comprises a longitudinally extending body that itself may take various forms, a longitudinal top rail extending along the upper edge of the body, and an anchoring member extending longitudinally along the lower edge of the body. In a preferred embodiment, the top rail is a tubular member of circular cross section that serves as a fluid conduit, permitting the use of various spray and sprinkler devices for watering plants adjacent the edging. The tubular member also assists to some extent in anchoring the upper edge above the surface of the ground by its rigidity and resistance to being bent over and broken, which is typically with edgings have straight top edges.

The tubular top rail of the primary embodiment is opaque, but in an alternative embodiment the top rail may be wholly or partially transparent, permitting the use of a low voltage conductor and a series of lights for use along walkways.

A primary feature of the invention resides in the anchoring member, which in the preferred embodiment takes the form of an inverted, hollow triangle that extends along the lower edge of the body. The inverted triangle is symmetrically disposed relative to the body, so that equal portions project laterally from the opposed faces of the body. Two of the triangular legs converge into a downwardly projecting central point that extends directly below the edging body.

The inventive edging is conventionally installed. A trench is dug, and the edging is inserted into the trench with the anchoring member pointed downward. As the dirt is refilled and compacted around the edging body, it surrounds the anchoring member. The laterally projecting portions of the triangular anchor resist upward movement of the edging, particularly during the winter sub-surface freeze, and the symmetry of the projecting member resists lateral movement. As such, the landscape edging is strongly anchored, maintaining its structural integrity and remaining stationary over extended periods of time.

A series of additional embodiments include a modification to the triangular anchoring member that addresses and solves a common problem encountered in packaging landscape edging. More specifically, the relatively large top rail and anchoring member are of considerable importance in overcoming the problem of season-to-season instability of the edging as described above. However, the cross-sectional profile of such an edging creates some degree of difficulty in packaging the edging for distribution and sale. Landscape edging is most commonly packaged in a coil, although it is sometimes packaged in a plurality of lengths. In either case, the irregular cross-sectional profile of virtually all landscape edging is inherently problematic in attempting to maintain the material in a compact coil, and the problem is compounded with the relatively large circular top rail and relatively large triangular anchoring member. This profile does not lend itself to coil or strip packaging that relies on a stable interrelationship between adjacent portions of the edging.

In view of this, the customary approach to packaging landscape edging is in coils of predetermined length that are sheathed in cardboard (e.g., boxes that are open on one or two ends). This is a suitable solution to the problem but a relatively expensive one, requiring not only the materials in creating the cardboard sheath or box but labor as well in handling each coil and placing it in the box.

Tying the formed coil at a plurality of points would be far less expensive from both the standpoints of materials and labor, but for the reasons discussed above the instability of the coil does not lend itself to such packaging.

The alternative embodiments of the invention permit the landscape edging to be at least partially retained in a packaged position (e.g., in a coil or adjacent strips), and hence to be tied or wound at a plurality of points, resulting in a package that is smaller, tighter and more easily handled. This is accomplished by forming an anchor member having a transverse dimension that is at least as wide as the top rail member, providing a longitudinal tongue along one side of the anchor member and a longitudinal groove that mates with the tongue on the opposite side of the anchor member. While it is within the scope of the invention to construct the tongue and groove in a manner which will cause them to interlock (e.g., a dovetail configuration that results in a snap fit), it is essential only that the tongue fit into the groove. This enables a finite length of the edging to be coiled, by machine or by hand, with the tongue and groove in mateable engagement, followed by tying the coil at a plurality of points. Each one of the ties forces the longitudinal tongue into the corresponding groove, resulting in coil stability. A tying clip may also be used with the tie that transversely overlies the top rails in the area of tying, providing additional stability to the packaged coil.

This improvement results in an edging package that is less expensive to accomplish, much more stable than conventional edging packaging and much easier to handle during transportation, distribution and sale.

DESCRIPTION OF THE PREFERRED EMBODIMENTS

Figure 1:
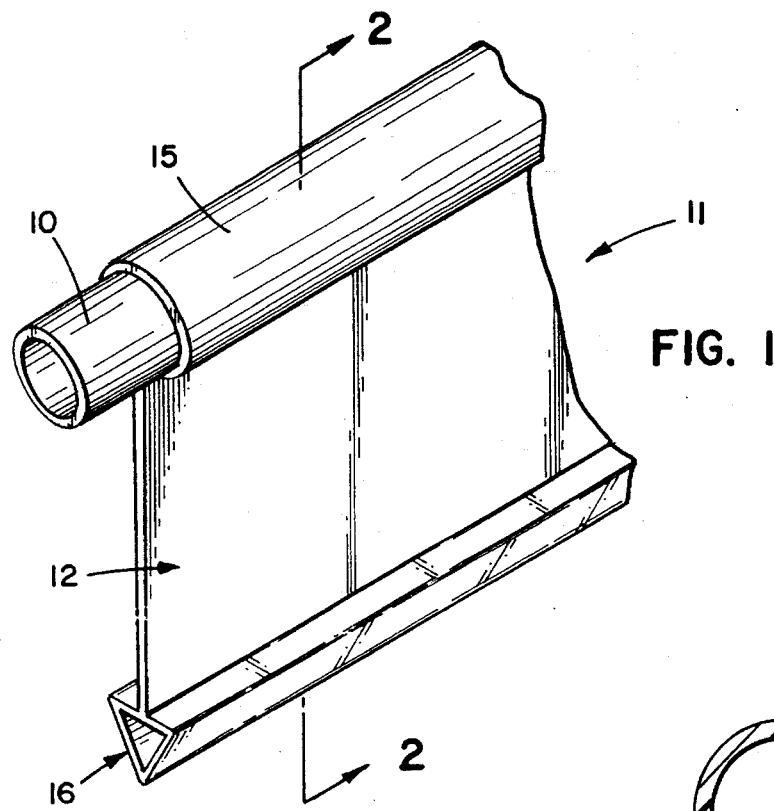
FIG. 1 is a fragmentary perspective view of the inventive landscape edging.
Figure 2:
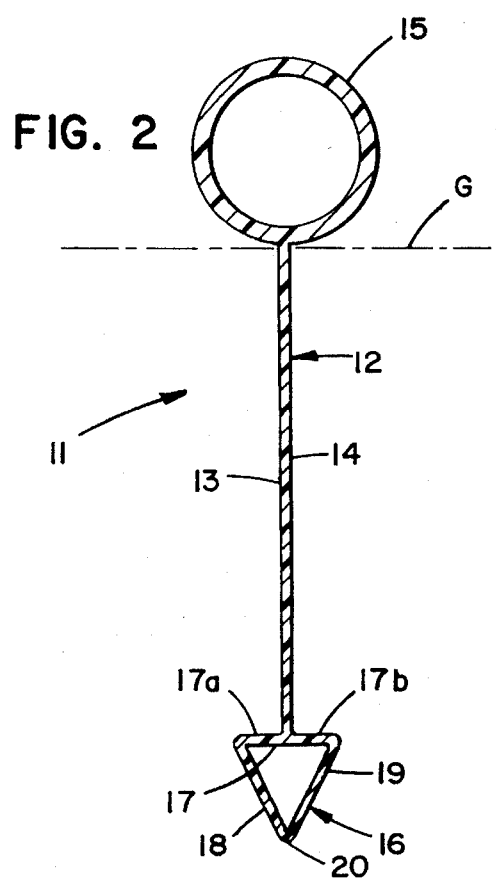
FIG. 2 is a transverse section view of the landscape edging taken along the line 2—2 of FIG. 1.

With initial reference to FIGS. 1 and 2, landscape edging embodying the invention is represented generally by the numeral 11. Edging 11 comprises a body 12 of predetermined length, height (or width) and thickness, and defining first and second opposed faces 13, 14. A top rail 15 extends longitudinally along the upper edge of body 12, and an anchoring member 16 extends longitudinally along its lower edge.

In the first preferred embodiment, body member 12 comprises a single planar strip of material joining the top rail 15 and anchoring member 16, which is intended to be disposed in a vertical position when installed.

As shown in FIG. 2, landscape edging 11 is intended to be installed with a first portion above the ground (reference letter G) and a second portion buried beneath the ground G. The preferred manner of installation for the first preferred embodiment is with the top rail 15 above the ground and the remainder of edging 11 below the ground.

Top rail member 15 comprises a continuous, hollow tubular member of circular configuration in the first embodiment. As such, the top rail 15 of one section of edging is adapted for connection with an adjacent section of edging by a tubular connector 10, the outer diameter of which permits a frictional fit into the top rail member 15 as shown in FIG. 1. Connector 10 not only provides a mechanical connection between adjacent strips of the edging 11, but also serves as a fluid connection to permit the flow of water through the top rail 15. Conventional spray fittings (not shown) may be inserted into the top rail 15 to permit spraying or sprinkling of water in areas adjacent the landscape edging 11.

Anchor member 16 extends longitudinally along the lower edge of body 12, and specifically takes the form of an inverted triangle when viewed in transverse cross section. As such, triangular anchoring member 16 includes a horizontal leg 17 and legs 18, 19 that converge to a point 20. Viewed from a broader perspective, anchoring member 16 comprises anchoring portions 17a, 17b that project laterally outward from the opposed faces 13, 14, respectively, and a pointed portion, defined by the converging legs 18, 19, that is intended for insertion into the ground.

In the preferred embodiment, the triangular anchoring member 16 is symmetrical relative to the body member 12, and for simplicity and economical manufacture, triangular anchoring member 16 is hollow.

Figure 3:
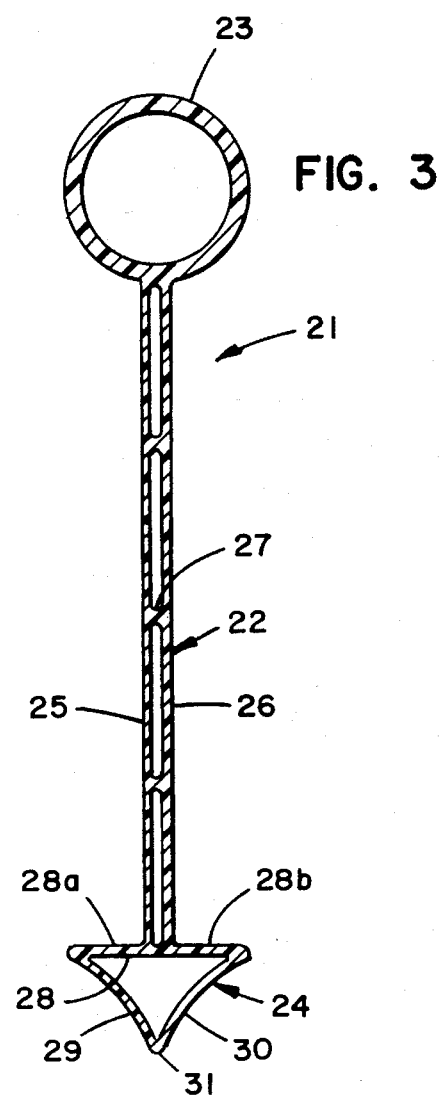
FIG. 3 is a transverse sectional view similar to FIG. 2 of a first alternative embodiment of the landscape edging.

In FIG. 3, an alternative embodiment of the landscape edging bears the general reference numeral 21, and comprises a body 22, top rail 23 and anchoring member 24. IN this embodiment, body 22 comprises spaced vertical planar strips 25, 26 strengthened by spaced ribs 27.

The spaced double wall construction is structurally important for several reasons, one of which is the increased strength and rigidity of the body 22. Coupled with the beam-like functions provided by the anchoring member 24 and the tubular top rail 23, edging 21 is extremely strong and capable of performing an edging function over extended periods of time, even in climates where it is exposed to extremely low and high temperatures.

In addition, the double wall construction for the body 22 is important from the manufacturing standpoint to provide precision formed edging with uniformly flat surfaces. After the edging is extruded, it is vacuum sized in a vacuum calibrating tank to remove variations in height and thickness. In moving between such steps in manufacturing, the edging undergoes significant changes in cooling (e.g., on the order of 100° F.), which with conventional edging can cause twisting and distortion. The double wall construction of the body 22 not only better withstands such temperature changes, but also enables a significantly greater amount of vacuum to be used in the vacuum sizing process to create a more uniform and better product.

Top rail 23 is virtually the same as top rail 15, comprising of an elongated tube of circular cross section.

An anchoring member 24 is also a triangular configuration, comprises a horizontal leg 28 and legs 29, 30 that converge to a point 31. In this embodiment, the leg 28 is somewhat wider than the corresponding leg 17 of edging 11, and defines laterally projecting portions 28a, 28b. Legs 29, 30 of anchoring member 24 are slightly concave, as compared with the straight legs 18, 19 of anchoring member 16.

Figure 4:
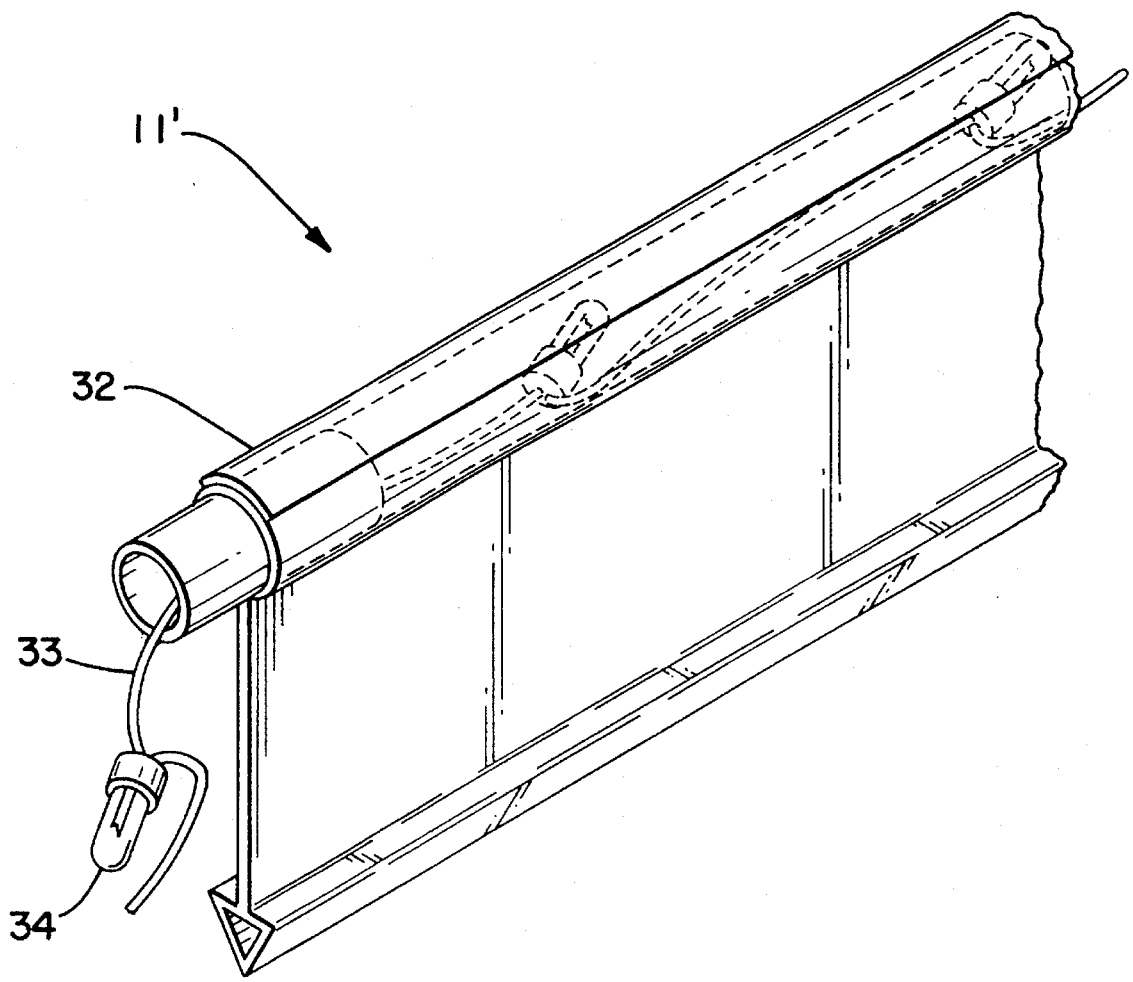
FIG. 4 is a perspective fragmentary view of a second alternative embodiment of the inventive landscape edging.

A variation to the top rail of the edging is shown in FIG. 4. The edging 11' shown in this figure is the same structurally as the edging 11 in all respects except the top rail, and like reference numerals are used for like components. The top rail, which bears reference numeral 32, is transparent, and a low voltage line 33 carrying spaced lights 34 runs through top rail 32 to provide a visual effect or a light guiding function. For example, the edging 11' provided with such lighting may be placed adjacent a garden path or driveway so that, in evening hours, the path or driveway is easily seen. Preferably, an opaque strip 35 covers the top portion of top rail 32 to cause light to radiate laterally outward and downward but not directly upward. Alternatively, top rail 32 may be completely transparent, or may be formed from a translucent material, to diffuse the light emitted by spaced lights 34 to provide a continuous visual effect.

Edgings 11, 11' and 21 are preferably formed from material that resists corrosion and other deterioration in the sub-ground surface environment (e.g., plastic). The design of each of the edgings 11, 11' and 21 permits manufacture by continuous extrusion from plastic. The edgings are sold in finite lengths, either in roll form or straight strips.

In the use of edgings 11, 11' and 21 a trench is first dug in the ground, having a depth permitting insertion of the edging into the ground up to the top rail. The trench is then filled in, compacting the earth around the anchoring member. The lateral projections of the anchoring member prevent raising of the edging even where the frost line extends below the edging, and the triangular configuration also assists in preventing lateral movement of the anchoring member. In addition, the triangular configuration functions as a longitudinal beam along the bottom edge of the edging to provide strength and stability over extended periods of time.

As such, each embodiment of the inventive landscape edging is easily installed and inherently provides an anchoring function that resists loosening or movement from season to season, even in climates where significant sub ground freezing takes place.

FIGS. 5–14 disclose additional embodiments of the inventive landscape edging as modified to facilitate packaging for handling, distribution and sale. Each of these embodiments broadly includes structural means formed on each side of the edging which mutually engage when opposite edging sides are disposed adjacent one another; e.g., when the edging is coiled or arranged in separate strips for packaging. The engagement of these structural means at least partially retains the edging in the packaged position, permitting it to be tied or wound at multiple points and resulting in a tight, stable package.

Figure 5:
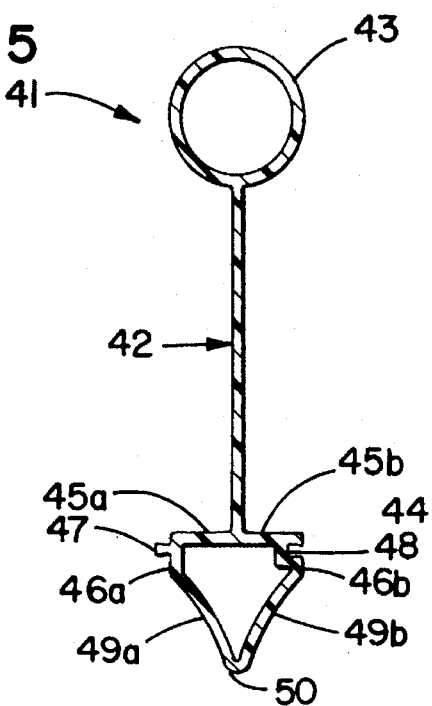
FIG. 5 is a transverse sectional view of a third alternative embodiment of the inventive landscape edging.
Figure 6:
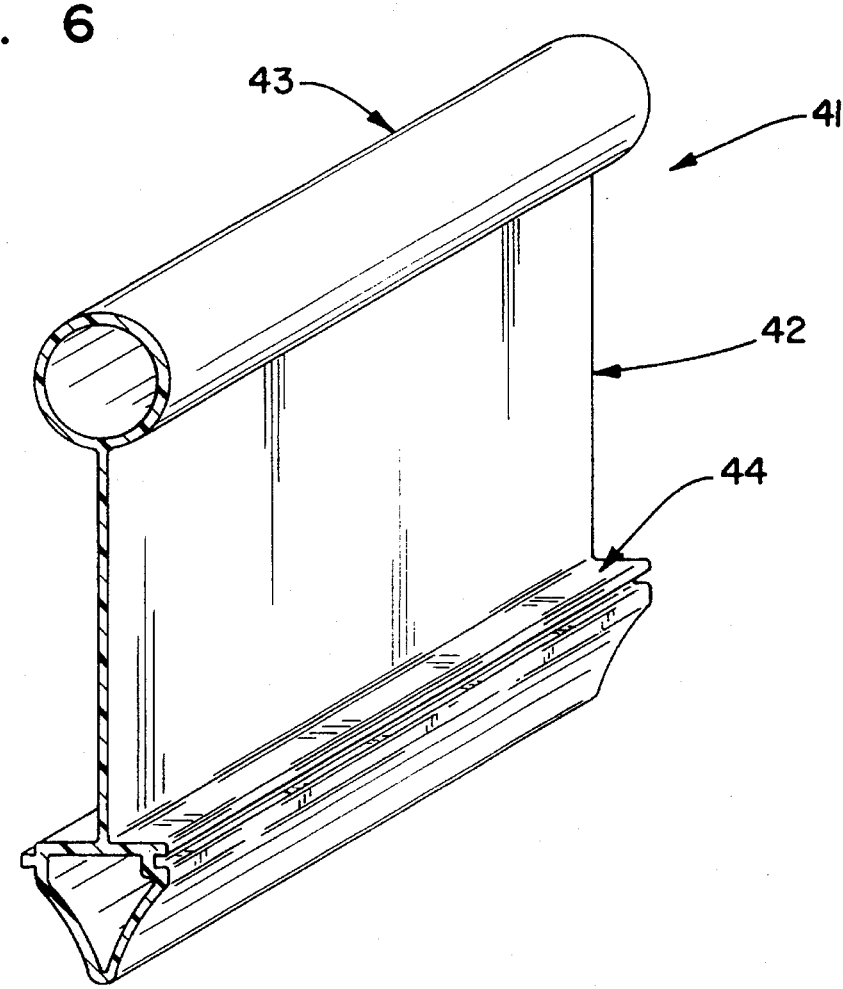
FIG. 6 is a perspective fragmentary view of a third alternative embodiment.

With reference to FIGS. 5 and 6, an alternative embodiment of the inventive landscape edging bears reference numeral 41 and includes a body 42 and top rail 43 similar to those of the edging 11 of FIGS. 1 and 2. The anchor member 44 is modified for packaging purposes. It comprises a first leg 45a that projects laterally from one face of the body 42 and a second leg 45b that projects laterally from the opposite face of body 42. Projecting downwardly from the extreme outer edge of leg 45a is a short substantially vertical leg 46a. A similar short leg 46b extends downward from lateral leg 45b.

An elongated tongue 47 projects laterally outward from short leg 46a, extending over the length of the anchor 44. An elongated groove 48 is formed in the short leg 46b in direct opposed relation to the tongue 47. Tongue 47 and groove 48 are sized and configured so that the tongue 47 may be inserted into the groove 48 in mateable relation. Although the invention contemplates an interlockable connection between tongue 47 and groove 48 (e.g., a dovetail relation), this is not an essential part of the invention.

Anchor member 44 further comprises a pair of slightly concave legs 49a, 49b that converge to a rounded point 50.

Figure 14:
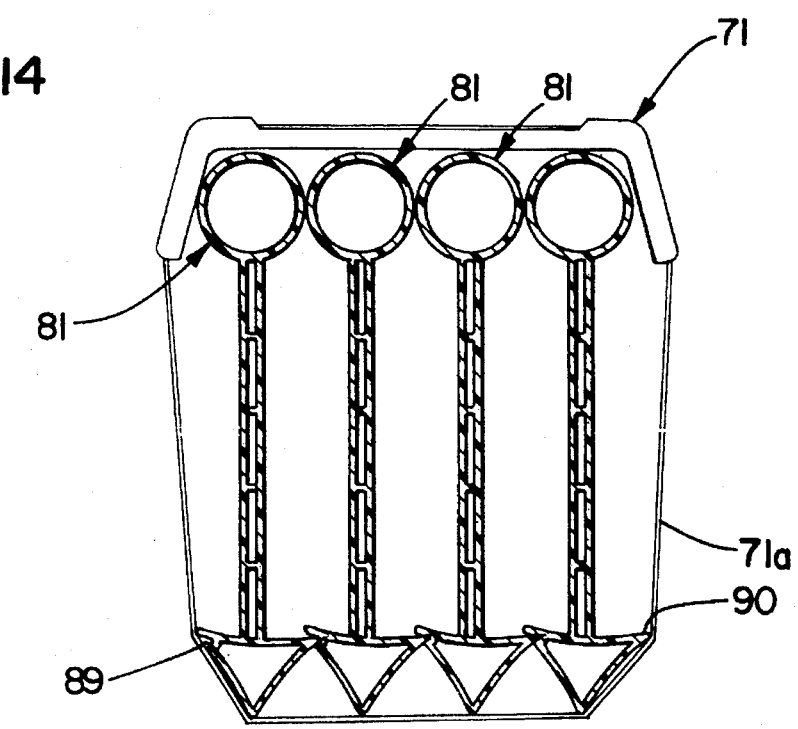
FIG. 14 is a transverse sectional view of a plurality of strips of the landscape edging of FIG. 13 in packaged form.

The tongue 47 and groove 48 mateably engage when the edging 41 is packaged by forming it into a coil (see FIGS. 9–12) or in parallel strips (see FIG. 14). To this end, it is preferable that the effective width of anchor 44 be approximately the same size as the transverse dimension (diameter) of the top rail 43. For the structure of edging 41, the effective width of anchor member 44 (i.e., the width disregarding the tongue 47) is the same as the diameter of top rail 43. In this manner, adjacent portions of mateably engaged segments of the edging 41 will be in parallel relation.

As with prior embodiments, the legs 45a, 45b are preferably horizontal (i.e., perpendicular to body 42) to present a shouldered surface to compacted soil when installed. Also as in prior embodiments, anchor member 44 is hollow to conserve material while providing a stable anchor. The hollow construction also enhances the overall flexibility of the edging 41.

Figure 7:
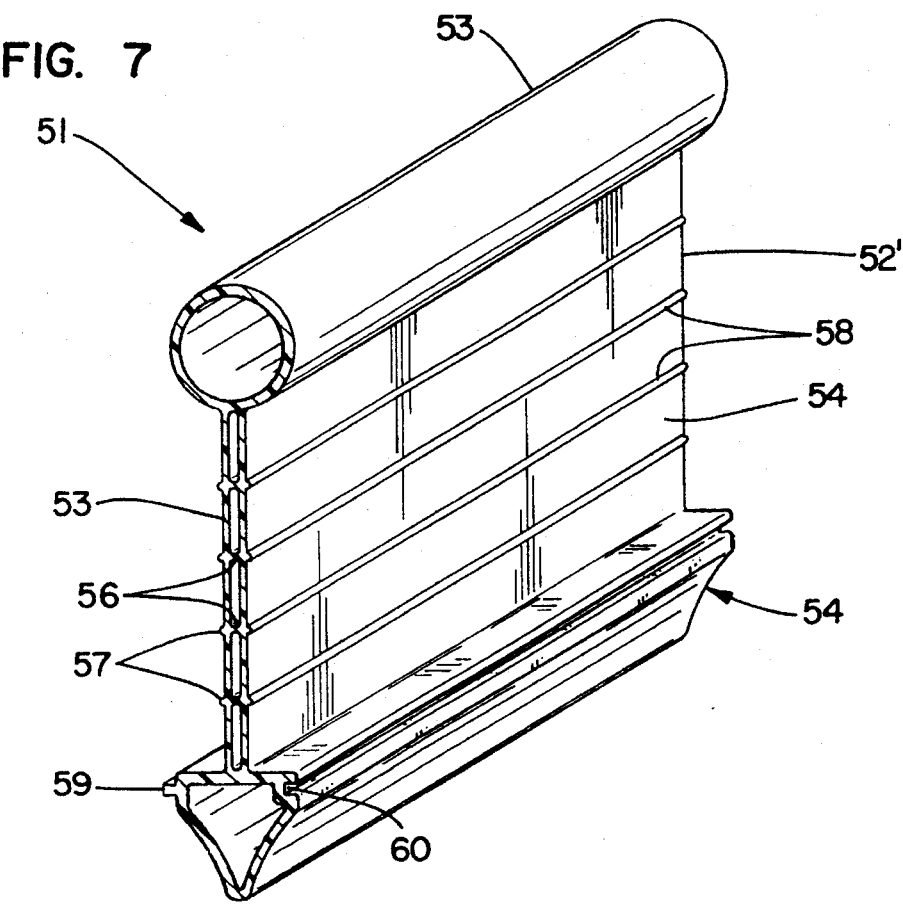
FIG. 7 is a perspective fragmentary view of a fourth alternative embodiment of the inventive landscape edging.

With reference to FIG. 7, an alternative edging 51 includes a top rail 53 and an anchoring member 54 that are structurally identical to the same components of edging 41. Body 52', however, is a double wall construction somewhat similar to edging 21 of FIG. 3. It comprises spaced parallel planar walls 54, 53 strengthened by a plurality of longitudinally extending, internal spaced ribs 56. In the preferred embodiment, there are four such longitudinal internal ribs 56. In addition, corresponding external ribs 57, 58 aligned with the respective internal ribs 55 project laterally outward from the respective walls 54, 55, extending longitudinally over the length of the edging 51. The internal ribs 56 and external ribs 57, 58 increase the strength and rigidity of the body 52. The external ribs 57, 58 assist in maintaining the edging 51 when buried, and also enhance the aesthetic appearance of the edging 51 prior to insertion into the ground.

The anchoring member 54 is structurally identical to the anchoring member 44 of edging 41, and includes a longitudinally extending tongue 59 and complementing groove 60.

The edgings 41, 51 may be coiled for packaging purposes as shown in FIGS. 9–12. Edging 41 is shown in these figures for exemplary purposes.

Figure 9:
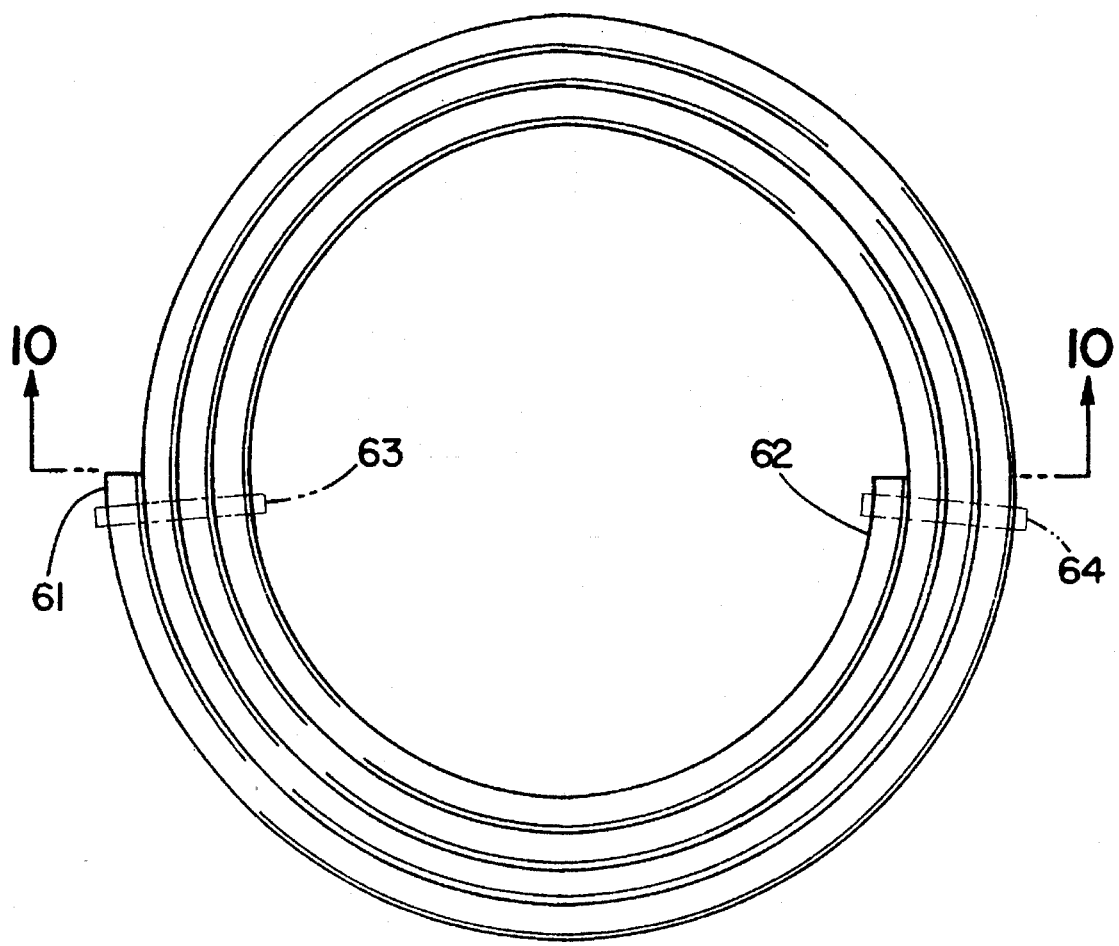
FIG. 9 is a view in top plan of a packaged coil of the inventive landscape edging utilizing the retaining clip of FIG. 8.
Figure 10:
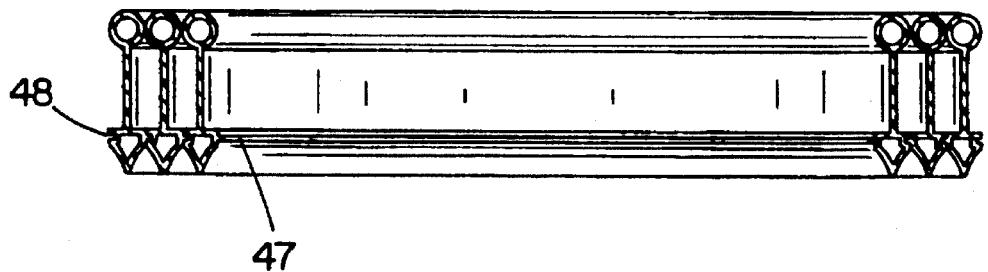
FIG. 10 is a sectional view taken along the line 10—10 of FIG. 9.

With reference to FIGS. 9 and 10, edging 41 is cut to a given length (e.g., 20, 25, 30, 40 or 60 feet) and coiled in a radius that causes the opposed ends, 61, 62 of this length to be diametrically opposed. This arrangement lends itself to tying the coil at two points 63, 64, respectively adjacent the ends 61, 62, to secure the coiled package. As shown in FIG. 10, the longitudinally extending tongue 47 is inserted into the corresponding groove 48 of the adjacent portion of the coil (see FIG. 10), which establishes both vertical and lateral stability of the coil anchor member 44.

Figure 11:
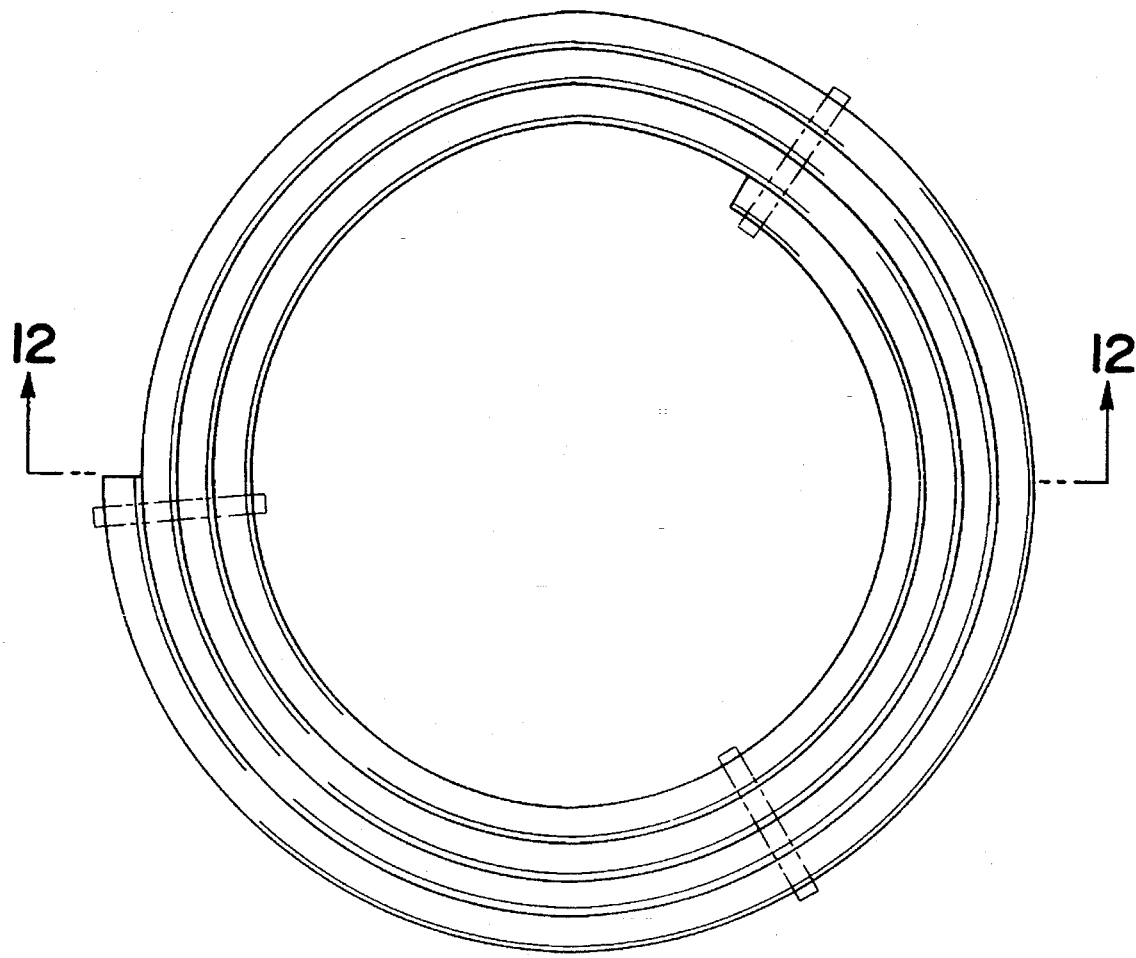
FIG. 11 view in top plan of a modified package for a coil of the inventive landscape edging utilizing the retaining clip of FIG. 8.
Figure 12:
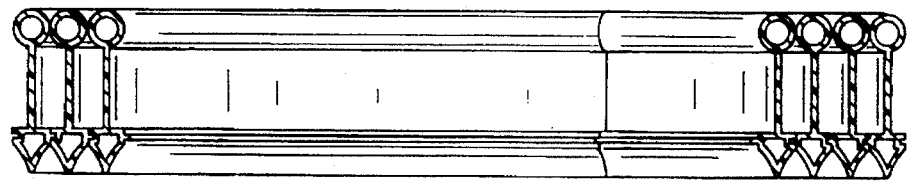
FIG. 12 is a sectional view taken along the line 12—12 of FIG. 11.

With reference to FIGS. 11 and 12, edging 41 is cut to a length slightly greater than the length of FIG. 11 and coiled in a radius that causes the opposed ends 65, 66 to be approximately 120 degrees apart. This arrangement lends itself to tying the coil at three points 67, 68, 69. The tying points 67, 68 are respectively adjacent the ends 65, 66, and tying point 69 is disposed equiangularly between the two.

Figure 8:
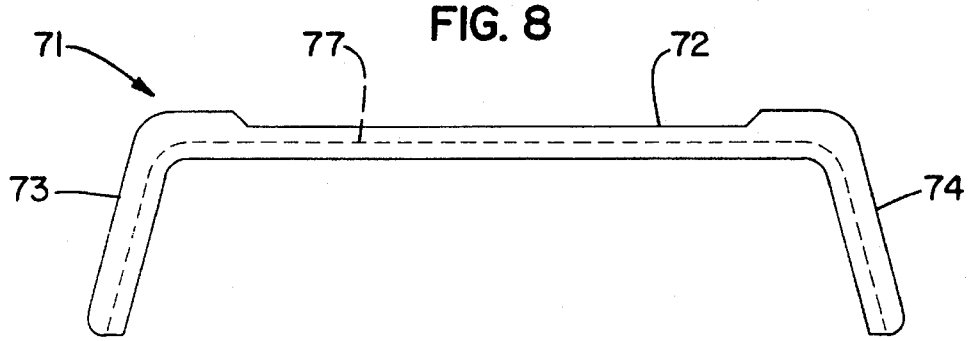
FIG. 8 is a view in side elevation of a retaining clip used in packaging the inventive landscape edging.
Figure 8A:
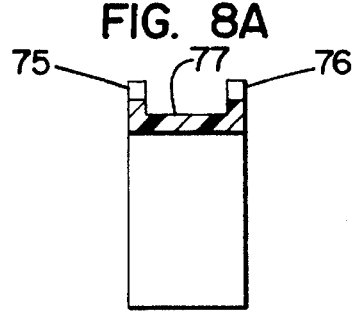
FIG. 8a is a sectional view taken along the line 8a—8a of FIG. 8.

With reference to FIGS. 8 and 8a, a tying support or clip bearing the general reference numeral 71 is preferably used at each of the tying points 63, 64 in FIG. 9 and 67–69 in FIG. 11. The tying clip 71 comprises an inverted, substantially U-shaped member formed with a straight central leg 72 with shorter legs 73, 74 projecting angularly downward from its opposite ends. Flanged sides 75, 76 project upward from the opposed sides of the legs 72–74, defining an elongated recess 77 that extends from the extreme end of the leg 73 over the top leg 72 and to the extreme end of leg 74.

The retaining clip 71 is sized and constructed to fit over the top of a coil length of the edging 41. As such, the effective length of the retaining clip 71 (i.e., the dimension between the extreme ends of leg 73, 74) is greater than the combined width of four coils of the edging 41 as shown in FIGS. 9 and 11. Retaining clip 71 fits over these adjacent coils at the tying points 63–64 and 67–69, retaining the adjacent top rails in tied adjacent relation. With suitable tying material (e.g., polypropylene pallet strapping) wrapped around the coil at each of the tying points 63–64 and 67–69, through the groove 77 of tying clip 71, tying clip 71 holds the respective top rails 53 in tight adjacent relation, and the tying material holds the anchor members 54 in tight adjacent relation with the tongue 59 projecting into the groove 60 (see also FIG. 14). It will be appreciated that, once these ties are made, no further packaging is necessary for the purpose of coil retention, although other identifying packaging material may be included as appropriate.

With the packaging shown in FIGS. 9–10 or 11–12, the resulting coil is rigidly and stably retained, resulting in a package that can be easily stacked, carried, transported, distributed and displayed.

Figure 13:
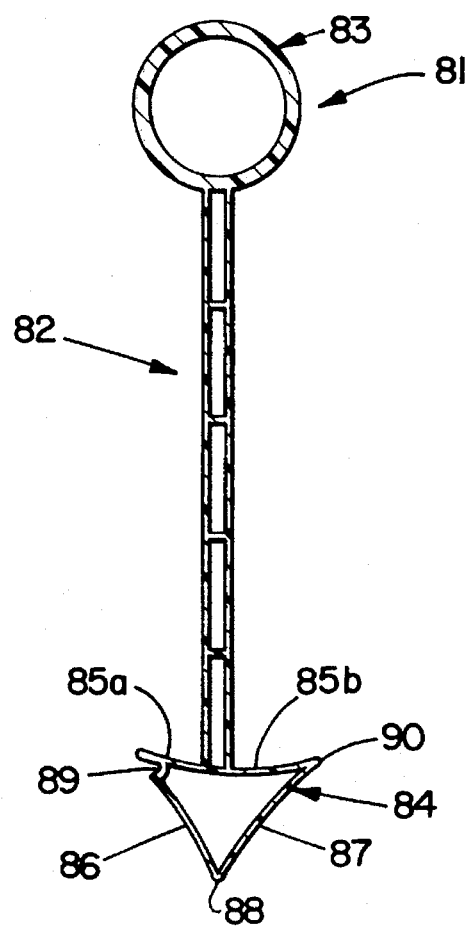
FIG. 13 is a transverse sectional view of a fifth alternative embodiment of the inventive landscape edging.

With reference to FIG. 13, and alternative edging 81 includes a body 82 and a top rail 83 that are structurally similar to the same components of edging 21. Anchoring member 84, represents an alternative approach to the tongue and groove packaging structure. Specifically, anchoring member 84 comprises a top, slight arcuate leg formed from a first leg segment 85a that projects laterally from one side of the body member 82 and a second leg segment 85b that projects laterally from the opposite face of body 82. Leg segment 85a is slightly shorter than leg segment 85b, and it also curves upwardly to a slightly greater extent than leg segment 85b. Slightly arcuate legs 86, 87 respectively extend from the extremities of leg segments 85a, 85b, converging to a point 88.

An elongated recess or groove 89 is formed at the juncture of leg segment 85a and leg 86 which extends inwardly of the generally triangular anchoring member 84. A line perpendicular to the body 82 which passes through the recess 89 also passes through the juncture of leg segments 85b and 87; i.e., recess 89 is disposed at the same level of the juncture of leg segment 85b and leg 87. As such, and since leg segment 85b is slightly longer than leg segment 85a, the juncture of leg segment 85b and leg 87 defines an elongated tongue 90 that is mateably engageable with the elongated groove 89 when different segments of the edging 81 are disposed in side-by-side relation as shown in FIG. 14.

FIG. 14 discloses four separate segments of the edging 81 of the same length (e.g., four feet) packaged in side-by-side relation with the juncture or tongue 90 of one edging length disposed in the elongated groove 89 of an adjacent edging length. When packaged in this manner, the effective width of the anchoring member 84 (the overall width less the tongue 90) corresponds to the diameter of the top rail 83. Accordingly, the several packaged edging lengths are disposed in parallel relation.

Based on the tongue and groove relationship, the adjacent anchoring members 84 are held in a rigid and stable relationship within this package. Preferably, one or more of the retaining clips 71 is placed over the top rails 83 in retaining relation, and tying material encircling the four edging lengths and the retaining clip 71 in the form of polypropylene strapping material 71a rigidly secures the lengths in this packaged form. As with the packaged coil, the packaged lengths shown on FIG. 14 can be easily carried, stacked, transported, displayed and sold in this form.

While the tongue and groove structure is shown in connection with the anchor members, it is also possible to include such structural members on the top rail in addition to or instead of on the anchoring member. It is also possible to use mutually engageable structural members other than the tongue and groove members.

What is claimed is:

1. Landscape edging, comprising:
   a body member of predetermined length, height and thickness, and defining a top portion, a bottom portion and first and second opposed faces, the landscape edging being adapted for partial insertion into the ground;
   a top rail member extending longitudinally along the top portion of the body member;
   an anchor member extending longitudinally along the bottom portion of the body member, the anchor member projecting laterally outward from each side of the body member; and
   first and second structural means respectively disposed on opposite sides of the anchor member, the first and second structural means being mutually engageable when adjacent portions of the edgings are disposed in side by side relation, the first structural means comprising a projecting portion and the second structural means comprising a receiving portion for the projecting portion, and said first and second structural means being constructed and arranged to at least partially retain the edging with said adjacent portions disposed in said side by side relation.

2. Landscape edging, comprising:
   a body member of predetermined length, height and thickness, and defining a top portion, a bottom portion and first and second opposed faces, the landscape edging being adapted for partial insertion into the ground;
   a top rail member extending longitudinally along the top portion of the body member;
   an anchor member extending longitudinally along the bottom portion of the body member, the anchor member projecting laterally outward from each side of the body member; and
   first and second structural means respectively disposed on opposite sides of the edging, the first and second structural means being mutually engageable when adjacent portions of the edging are disposed in side by side relation, at least one of said first and second structural means being substantially continuous over the length of said landscape edging, the first structural means comprising a projecting portion and the second structural means comprising a receiving portion for the projecting portion, and said first and second structural means being constructed and arranged to at least partially retain the edging with said adjacent portion in said side by side relation.

3. The landscape edging defined by claim 2, wherein each of said first and second structural means is substantially continuous over the length of said landscape edging.

4. The landscape edging defined by claim 3, wherein the first structural means comprises a tongue member and the second structural means comprises a groove.

5. The landscape edging defined by claim 4, wherein the tongue member and groove are disposed on opposite sides of said anchor member.

6. Landscape edging, comprising:

a body member of predetermined length, height and thickness, and defining a top portion, a bottom portion and first and second opposed faces, the landscape edging being adapted for partial insertion into the ground;

a top rail member extending longitudinally along the top portion of the body member;

an anchor member extending longitudinally along the bottom portion of the body member, the anchor member projecting laterally outward from each side of the body member; and tongue means and groove means respectively disposed on opposite sides of said anchor member, the tongue means and groove means being mutually engageable when adjacent portions of the edging are disposed in side by side relation, the tongue means and groove means being constructed and arranged to at least partially retain the edging with said adjacent portions disposed in side by side relation.

7. The landscape edging defined by claim 6, wherein said tongue means and groove means are respectively disposed on opposite sides of said anchor member.

8. The landscape edging defined by claim 7, wherein the tongue means comprises a tongue member extending continuously over the length of said anchor member, and said groove means comprises a groove extending continuously over the length of said anchor member.

9. The landscape edging defined by claim 2, wherein said first and second structural means are respectively disposed on opposite sides of said anchor member.

10. The landscape edging defined by claim 9, wherein the greatest transverse dimensions of said top rail member and said anchoring member are approximately the same.

11. The landscape edging defined by claim 9, wherein the first structural means comprises tongue means and the second structural means comprises groove means.

12. The landscape edging defined by claim 11, wherein the tongue means comprises a tongue member extending continuously over the length of said anchor member, and said groove means comprises a groove extending continuously over the length of said anchor member.

13. The landscape edging defined by claim 12, wherein the anchor member is triangular in shape when viewed in transverse section, the triangular anchor member being disposed in an inverted position with portions thereof projecting laterally outward from the respective first and second opposed faces of the second longitudinal portion, and with a point of the triangular anchor member directed downward for insertion into the ground.

14. The landscape edging defined by claim 13, wherein the triangular anchor member is hollow over its length.

15. The landscape edging defined by claim 14, wherein the triangular anchor member comprises first and second anchoring leg members projecting laterally from opposite faces of the body member, and first and second converging leg members projecting downward from a juncture with the first and second anchoring leg members, respectively, in converging relation to define a point.

16. The landscape edging defined by claim 15, wherein the tongue member is disposed at the juncture of the first anchoring leg member and first converging leg member, and the groove is disposed at the juncture of the second anchoring leg member and second converging leg member.

17. The landscape edging defined by claim 16, which further comprises first and second vertical leg members disposed respectively between said first anchoring member and said first converging leg member, and between said second anchoring member and said second converging leg member, said tongue member being formed on said first vertical leg member, and the groove being formed in said second vertical leg member.

18. The landscape edging defined by claim 16, wherein the juncture of said first anchoring member and said first converging leg member defines said tongue member.

19. The landscape edging defined by claim 10, wherein a finite length of said edging is formed into a coil with said first and second structural means in mutual engagement, and further comprising retainer means for retaining said edging in coil form.

20. The landscape edging defined by claim 19, wherein the retainer means comprises a plurality of retainer clips, each of which is constructed to transversely span said top rail members with the edging in said coiled configuration, and trying means wound around said clip and said coil configuration.

21. The landscape edging defined by claim 20, wherein each of said retainer clips is substantially V-shaped and comprises channel means formed in the outer face thereof to receive and retain said tying means.

22. The landscape edging defined by claim 21, wherein the ends of said coil configuration are diametrically opposed, and a retaining clip is disposed adjacent each of said ends.

\* \* \* \* \*